(12) United States Patent
Lannom

(10) Patent No.: US 6,226,029 B1
(45) Date of Patent: May 1, 2001

(54) AERIAL SLOW SCAN POSITION CONTROL USING AN ELECTRONICALLY ADDRESSABLE LIQUID CRYSTAL PLATE

(75) Inventor: James W. Lannom, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/299,263

(22) Filed: Apr. 26, 1999

(51) Int. Cl.$^7$ .................................................. B41J 2/435
(52) U.S. Cl. ................................... 347/248; 347/234
(58) Field of Search ................................. 347/234, 235, 347/239, 248, 250, 255, 136; 250/229; 358/505, 450; 355/71, 24

(56) References Cited

U.S. PATENT DOCUMENTS

| | | | |
|---|---|---|---|
| 4,040,096 | 8/1977 | Starkweather | 358/302 |
| 4,374,397 | * 2/1983 | Mir | 358/505 |
| 5,049,897 | 9/1991 | Ng | 347/250 |
| 5,204,523 | 4/1993 | Appel et al. | 250/236 |
| 5,208,456 | 5/1993 | Appel et al. | 250/236 |
| 5,212,381 | 5/1993 | Appel et al. | 250/236 |
| 5,363,128 | 11/1994 | Andrews | 347/134 |
| 5,418,904 | * 5/1995 | Tomiyasu et al. | 355/24 |
| 5,764,273 | 6/1998 | Paoli | 347/248 |

* cited by examiner

Primary Examiner—N. Le
Assistant Examiner—Hai C. Pham
(74) Attorney, Agent, or Firm—Oliff & Berridge, PLC

(57) ABSTRACT

Printers that correct for polygon phasing errors. Such printers include a raster output scanner, a moving photoreceptor, a page sensor for sensing the position of an image area, a start-of-scan sensor for sensing the start of scan, a light valve array having a plurality of electrically controlled light valves for selectively passing light, and a system controller that controls the light valve(s). The system controller initially selects one of the light valves. When the page sensor senses the beginning of a page the system controller starts selecting sequential light valves at a controlled rate. After a start-of-scan occurs the system controller stops sequencing the light valves. The light valve that passed light when the start-of-scan occurred continues to pass light. Beneficially, the system controller monitors the photoreceptor motion. If the photoreceptor motion changes the system controller then selects a light valve that moves the scan line toward the proper position.

20 Claims, 3 Drawing Sheets

AERIAL SLOW SCAN POSITION CONTROL USING AN ELECTRONICALLY ADDRESSABLE LIQUID CRYSTAL PLATE

FIELD OF THE INVENTION

This invention relates to electrophotographic marking machines. More particularly, it relates to aerially correcting the process direction spot position using an electronically addressable liquid crystal plate.

BACKGROUND OF THE INVENTION

Electrophotographic marking is a well known and commonly used method of copying or printing documents. Electrophotographic marking is performed by exposing a substantially uniformly charged photoreceptor with a light image representation of a desired document. In response to that light image the photoreceptor discharges so as to create an electrostatic latent image of the desired document on the photoreceptor's surface. Toner particles are then deposited onto that latent image to form a toner image. That toner image is then transferred from the photoreceptor onto a copy substrate, such as a sheet of paper. The transferred toner image is then fused to the copy substrate, usually using heat and/or pressure. The surface of the photoreceptor is then cleaned of residual developing material and recharged in preparation for the production of another image.

The foregoing broadly describes a black and white electrophotographic marking machine. Electrophotographic marking can also produce color images by repeating the above process once for each color of toner that is used to make the composite color image. For example, in one color process, called the REaD IOI process (Recharge, Expose, and Develop, Image On Image), a charged photoreceptive surface is exposed to a light image which represents a first color, say black. The resulting electrostatic latent image is then developed with black toner to produce a black toner image. The recharge, expose, and develop process is repeated for a second color, say yellow, then for a third color, say magenta, and finally for a fourth color, say cyan. The various latent images and consequently the color toners are placed in a superimposed registration such that a desired composite color image results. That composite color image is then transferred and fused onto a substrate.

The foregoing color printing process can be performed in a various ways. For example, in a single pass printer wherein a composite image is produced in a single pass of the photoreceptor through the machine. This requires a charging, an exposing, and a developing station for each color of toner. Single pass printers are advantageous in that they are relatively fast since a composite color image can be produced in one cycle of the photoreceptor.

One method of exposing the photoreceptor is to use a Raster Output Scanner (ROS). A ROS is typically comprised of a laser light source (or sources), a rotating polygon having a plurality of mirrored facets, and pre-polygon and post-polygon optical systems. The light source radiates a laser beam into the pre-polygon optical system. The optical system collimates the laser beam and directs the collimated beam onto the rotating polygon facets. Those facets reflect the incoming beam into a sweeping beam that is directed into the post-polygon optical system. The post-polygon optical system corrects for various defects (such as wobble correction and scan line non-linearities) and focuses the sweeping beam onto a photoreceptor, thereby producing a light spot. As the polygon rotates the spot traces lines, referred to as scan lines, on the photoreceptor. By moving the photoreceptor in a process direction (also referred to as the slow scan direction) as the spot traces scan lines in the fast scan direction, the surface of the photoreceptor is raster scanned by the spot. During scanning, the laser beam is modulated by image data synchronized with the movement of the spot across the photoreceptor. Thus, individual picture elements ("pixels") of the image are sequentially created on the photoreceptor.

While raster output scanners are beneficial, they have problems. One set of problems relates to scan line position errors in the slow scan direction. Scan line position errors of greater than 10% of the nominal line spacing can be noticeable in a half tone or continuous tone image. Because of the sensitivity of the human eye to color variations, color images are even more susceptible to scan line position errors.

Scan line position errors arise from many sources, such as polygon and/or photoreceptor motion flaws, facet and/or photoreceptor surface defects, photoreceptor stretching, and phasing errors between photoreceptor motion and facet position. Phasing errors arise because when the photoreceptor is in the proper position to receive an image a facet may not be in position to produce a scan line. As the printer delays writing a scan line until a facet is properly positioned the photoreceptor continues advancing. When a facet is properly positioned the photoreceptor has advanced, producing a scan line error. While phasing errors are generally small, in high quality systems, particularly color, the errors can be noticeable.

Scan line position errors can be corrected using closely spaced light valves (such as liquid crystal modulators, reflecting Fabry-Perot modulators, total internal reflective modulators, or a waveguide modulator/amplifier) that selectively block portions of a light beam from reaching the photoreceptor. Reference U.S. Pat. No. 5,049,897 issued on Sep. 17, 1991 to Ng entitled "Method and Apparatus for Beam Displacement in a Light Beam Scanner," and U.S. Pat. No. 5,764,273, issued on Jun. 9, 1998 to Paoli entitled, "Spot Position Control Using a Linear Array of Light Valves."

The use of closely spaced light valves to selectively block portions of a light beam is a useful technique since the position of a scan line on a photoreceptor is directly controlled by selecting which light valve(s) should pass light. That technique is particularly beneficial for correcting for phasing errors. Unfortunately, prior art techniques of selecting which light value(s) to turn on require the determination of the existence and the extent of scan line position errors. Only then can the proper light valve(s) be selected. U.S. Pat. No. 5,764,273 teaches using a feedback control system comprised of marks on the photoreceptor, a synchronization strobe and sensor, a signal processing circuit, a control apparatus, and a switching circuit that selects the proper light valves. Alternatively, U.S. Pat. No. 5,764,273 teaches using stored data and a switching circuit. U.S. Pat. No. 5,049,897 teaches using an encoder that monitors the web (photoreceptor) speed, phase-locking the raster output polygon motor to the web (photoreceptor), logic circuitry that compares the web (photoreceptor) speed with a predetermined constant, a logic and control unit (LCU) that calculates a potential scan line spacing error and that generates a control signal, and a driver that uses the control signal to select the proper light valve(s) to pass light.

While the prior art techniques of selecting the proper light valve(s) to correct for slow scan spot position errors are beneficial, they are rather complex, costly and/or difficult to implement. This is particularly true when correcting for phasing errors. Thus, a need exists for an improved method of determining which light valve(s) should be selected so as to correct for slow-scan direction spot position errors. Even more beneficial would be a simple, easily implemented method of selecting the proper light valve(s) to pass light when correcting for phasing errors.

SUMMARY OF INVENTION

The principles of the present invention provide for raster output scanner based printers that correct for polygon phasing errors. A printer in accordance with the principles of the present invention includes a laser-based raster output scanner, a moving photoreceptor, a page sensor for sensing the position of an image area on the photoreceptor, a start-of-scan sensor for sensing the start of scan, a light valve array having a plurality of electrically controlled light valves that selectively pass light, and a system controller that selects which light valve(s) that passes light. The system controller initially selects one of the light valves to pass light. When the page sensor senses the beginning of a page the system controller starts selecting sequential light valves, beneficially at a rate that depends upon the motion of the photoreceptor. When the start-of-scan sensor detects a start-of-scan, the system control stops sequencing the light valves. When the sequencing stops the light valve that passed light when the start-of-scan occurred continues to pass light. Beneficially, the system controller continues to monitor the photoreceptor motion. If the photoreceptor motion changes the system controller then selects a light valve such that the scan line moves toward the proper position.

BRIEF DESCRIPTION OF THE DRAWINGS

Other features of the present invention will become apparent as the following description proceeds and upon reference to the drawings, in which:

FIG. 3 is schematically illustrates a system controller selecting a light valve that

DETAILED DESCRIPTION OF THE INVENTION

While the present invention will be described in connection with a preferred embodiment, it should be understood that the present invention is not limited to that embodiment. On the contrary, the scope of the present invention covers all alternatives, modifications, and equivalents as may be included within the spirit and scope of the appended claims.

Figure 1:
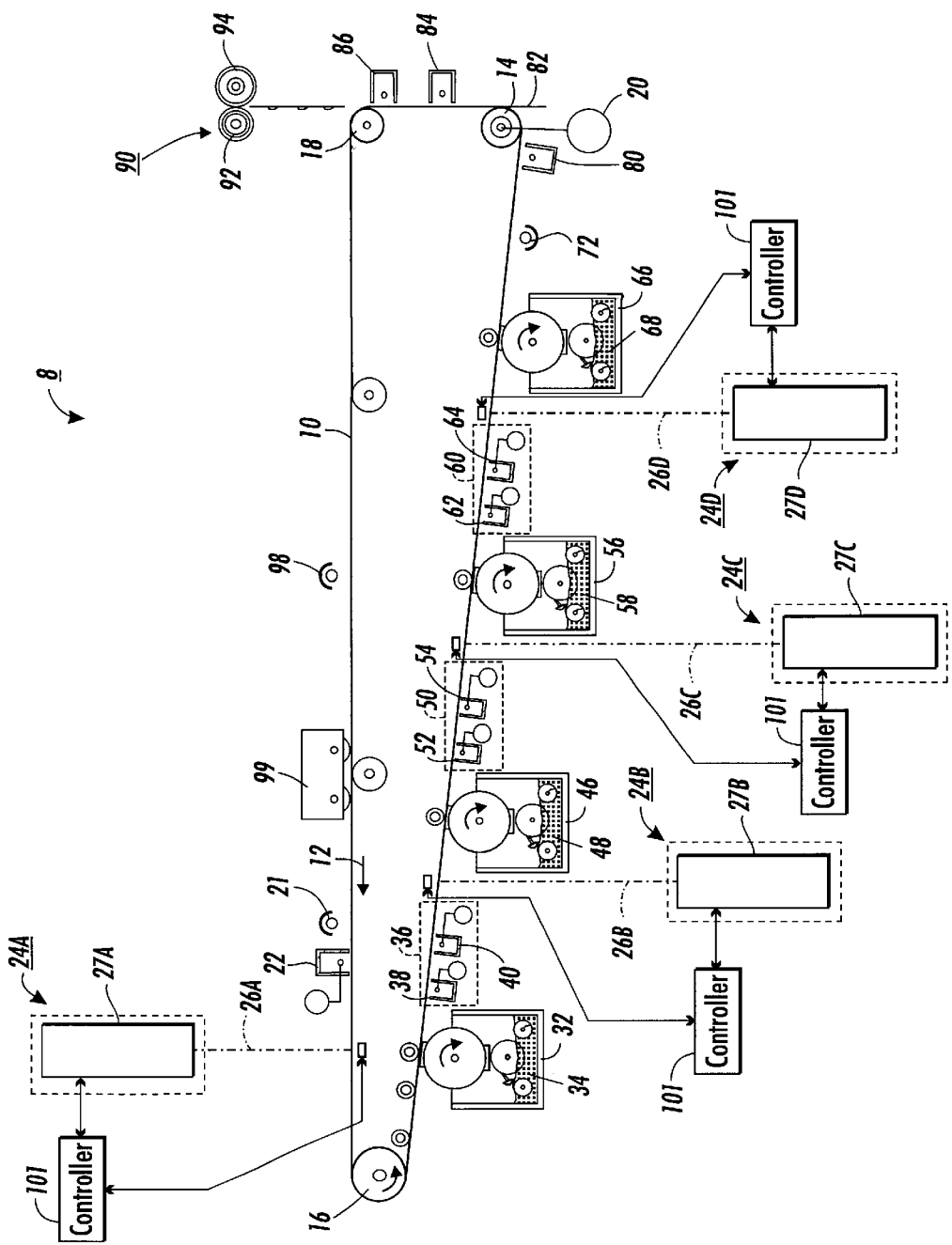
FIG. 1 is a schematic illustration of a printing apparatus according to the principles of the present invention.

FIG. 1 illustrates an electrophotographic printing machine 8 that is suitable for use with the principles of the present invention. The printing machine 8 is a single pass, Recharge-Expose-and-Develop, Image-on-Image (Read IOI) printer. However, it is to be understood that the present invention is applicable to many other types of systems. Therefore, it is to be understood that the following description of the printing machine 8 is only to assist the understanding of the principles of the present invention.

The printing machine 8 includes an Active Matrix (AMAT) photoreceptor belt 10 which travels in the direction indicated by the arrow 12. Belt travel is brought about by mounting the photoreceptor belt about a driven roller 14 and about tension rollers 16 and 18, and then driving the driven roller 14 with a motor 20.

As the photoreceptor belt travels each part of it passes through each of the subsequently described process stations. For convenience, a single section of the photoreceptor belt, referred to as the image area, is identified. The image area is that part of the photoreceptor belt which is to receive the various actions and toner layers that produce the final composite color image. While the photoreceptor belt may have numerous image areas, since each image area is processed in the same way a description of the processing of one image area suffices to explain the operation of the printing machine 8.

The imaging process begins with the image area passing a "precharge" erase lamp 21 that illuminates the image area so as to cause any residual charge which might exist on the image area to be discharged. Such erase lamps are common in high quality systems and their use for initial erasure is well known.

As the photoreceptor belt continues its travel the image area passes a charging station comprised of a DC corotron 22. The DC corotron charges the image area in preparation for exposure to create a latent image for black toner. For example, the DC corotron might charge the image area to a substantially uniform potential of about −500 volts. It should be understood that the actual charge placed on the photoreceptor will depend upon many variables, such as the black toner mass that is to be developed and the settings of the black development station (see below).

After passing the charging station the image area advances to an exposure station 24A. At the exposure station the charged image area is exposed to a modulated laser beam 26A from a raster output scanner 27A that raster scans the image area such that an electrostatic latent representation of a black image is produced. Significantly, the position of the laser beam 26A on the photoreceptor is determined for each facet of a rotating, multi-faceted polygon that is within the exposure station. Using the determined position the scan line position is corrected and the laser beam modulation is controlled such that the black latent image is imaged at a known position on the photoreceptor. A more detailed description of the raster output scanner 27A (as well as the raster output scanners 27B–27D that are discussed below) and the determining and control of the laser beam's position is given subsequently.

Still referring to FIG. 1, after passing the exposure station 24A the exposed image area with the black latent image passes a black development station 32 that advances black toner 34 onto the image area so as to develop a black toner image. Biasing is such as to effect discharged area development (DAD) of the lower (less negative) of the two voltage levels on the image area. The charged black toner 34 adheres to the exposed areas of the image area, thereby causing the voltage of the illuminated parts of the image area to be about −200 volts. The non-illuminated parts of the image area remain at about −500 volts.

After passing the black development station 32 the image area advances to a recharging station 36 comprised of a DC corotron 38 and an AC scorotron 40. The recharging station 36 recharges the image area and its black toner layer using a technique known as split recharging. Split recharging is described in U.S. Pat. No. 5,600,430, which issued on Feb. 4, 1997, and which is entitled, "Split Recharge Method and Apparatus for Color Image Formation." Briefly, the DC corotron 38 overcharges the image area to a voltage level greater than that desired when the image area is recharged, while the AC scorotron 40 reduces that voltage level to that which is desired. Split recharging serves to substantially eliminate voltage differences between toned areas and untoned areas and to reduce the level of residual charge remaining on the previously toned areas. This benefits subsequent development by different toners.

The recharged image area with its black toner layer then advances to an exposure station 24B. There, a laser beam 26B from a raster output scanner 27B exposes the image area to produce an electrostatic latent representation of a yellow image. In a manner similar to that of the laser beam 26A, the position of the laser beam 26B on the photoreceptor is determined and controlled, and the laser beam modulated is controlled such that the yellow latent image is in superimposed registration with the black latent image. Again, a more detailed description of the raster output scanners (27A–27D) and the determining and control of the laser beam's position are given subsequently.

The now re-exposed image area then advances to a yellow development station 46 that deposits yellow toner 48 onto the image area. After passing the yellow development station the image area advances to a recharging station 50 where a DC scorotron 52 and an AC scorotron 54 split recharge the image area.

An exposure station 24C then exposes the recharged image area. A modulated laser beam 26C from a raster output scanner 27C then exposes the image area to produce an electrostatic latent representation of a magenta image. In a manner similar to that of the laser beams 26A and 26B, the position of the laser beam 26C on the photoreceptor is determined and controlled, and the laser beam 26C is modulated such that the magenta latent image is in superimposed registration with the black and yellow latent images. Again, a more detailed description of the raster output scanners (27A–27D) and the determining and control of the laser beam's position are given subsequently.

After passing the magenta exposure station the now re-exposed image area advances to a magenta development station 56 that deposits magenta toner 58 onto the image area. After passing the magenta development station the image area advances another recharging station 60 where a DC corotron 62 and an AC scorotron 64 split recharge the image area.

The recharged image area with its toner layers then advances to an exposure station 24D. There, a laser beam 26D from a raster output scanner 27D exposes the image area to produce an electrostatic latent representation of a cyan image. A more detailed description of the raster output scanners (27A–27D) and the determining and control of the laser beam's position are given subsequently.

After passing the exposure station 24D the re-exposed image area advances past a cyan development station 66 that deposits cyan toner 68 onto the image area. At this time four colors of toner are on the image area, resulting in a composite color image. However, the composite color toner image is comprised of individual toner particles that have charge potentials that vary widely. Directly transferring such a composite toner image onto a substrate would result in a degraded final image. Therefore it is beneficial to prepare the composite color toner image for transfer.

To prepare the composite toner image for transfer a pretransfer erase lamp 72 discharges the image area to produce a relatively low charge level on the image area. The image area then passes a pretransfer DC scorotron 80 that performs a pre-transfer charging function. The image area continues to advance in the direction 12 past the driven roller 14. A substrate 82 is then placed over the image area using a sheet feeder (which is not shown). As the image area and substrate continue their travel they pass a transfer corotron 84 that applies positive ions onto the back of the substrate 82. Those ions attract the negatively charged toner particles onto the substrate.

As the substrate continues its travel is passes a detack corotron 86. That corotron neutralizes some of the charge on the substrate to assist separation of the substrate from the photoreceptor 10. As the lip of the substrate 82 moves around the tension roller 18 the lip separates from the photoreceptor. The substrate is then directed into a fuser 90 where a heated fuser roller 92 and a pressure roller 94 create a nip through which the substrate 82 passes. The combination of pressure and heat at the nip causes the composite color toner image to fuse into the substrate. After fusing, a chute, not shown, guides the substrate to a catch tray, also not shown, for removal by an operator.

After the substrate 82 is separated from the photoreceptor belt 10 the image area continues its travel and passes a preclean erase lamp 98. That lamp neutralizes most of the charge remaining on the photoreceptor belt. After passing the preclean erase lamp the residual toner and/or debris on the photoreceptor is removed at a cleaning station 99. The image area then passes once again to the precharge erase lamp 21 and the start of another printing cycle.

The printer 8 also includes a system controller 101 that controls the overall operation of the printer. The system controller preferably comprises one or more programmable microprocessors that operate in accordance with a software program stored in a suitable memory. Of importance to understanding the principles of the present invention is that the system controller synchronizes the overall operation of the printer 8 and provides video information to the laser beams 26A–26D.

The system controller also drives the motor 20 such that the photoreceptor 10 advances at a nominal rate. However, because of various factors discussed in the "Background of the Invention," the absolute position of the image area is not accurately known. In particular, since the polygon rotation is not synchronized with the photoreceptor motion a facet is not necessarily in position to write a scan line when the image area is in position (hence phasing errors). The printer 8 addresses phasing error problems using printer elements shown in FIG. 2.

Figure 2:
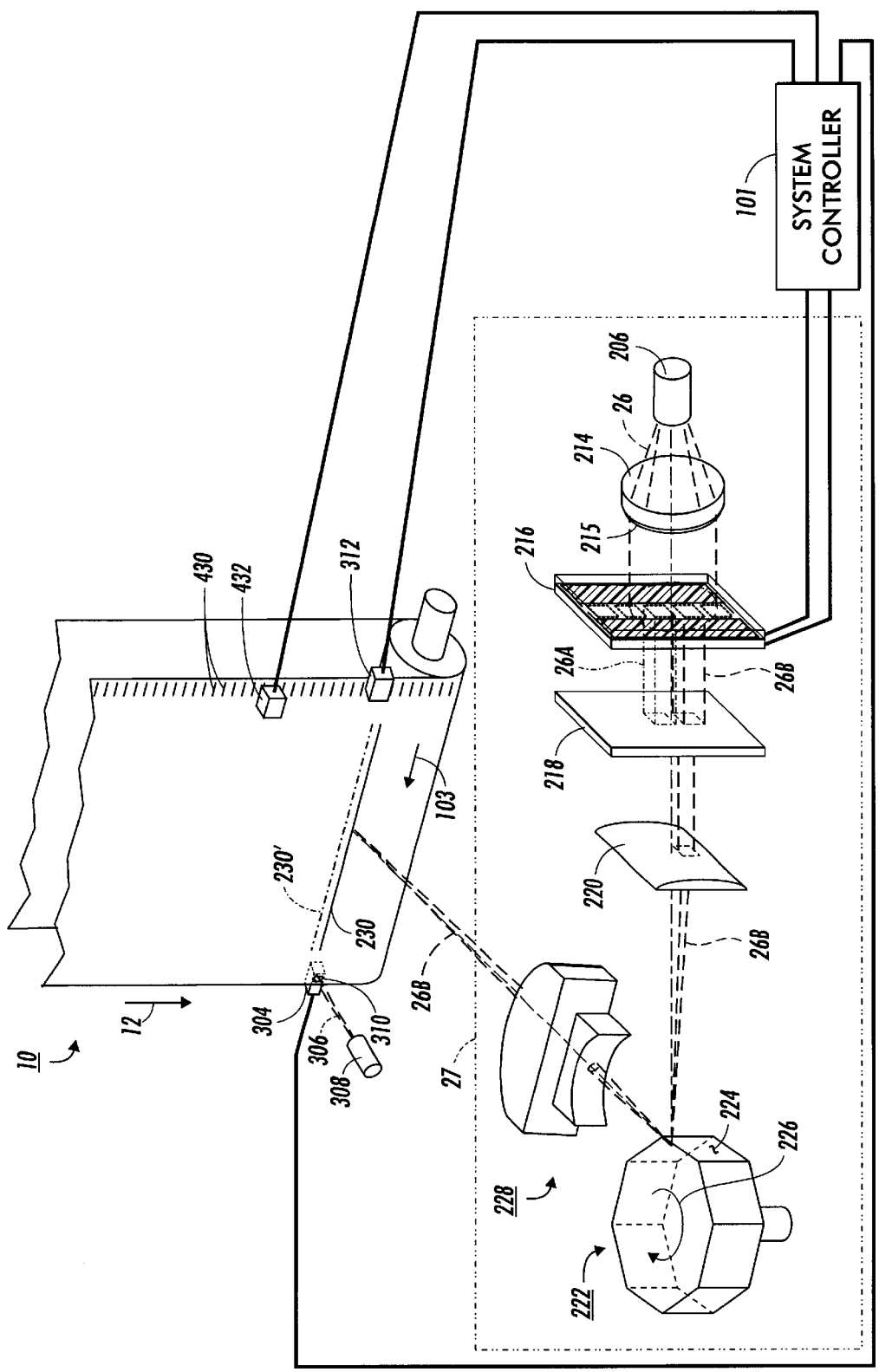
FIG. 2 is a schematic illustration of selected printer elements producing a scan line.

As shown in FIG. 2, a generic raster output scanner 27 includes a laser diode 206 that produces a laser beam 26. As emitted the laser beam 26 is diverging. A spherical lens 214 collimates the divergent beam and while a polarizing filter 215 polarizes the collimated beam. The polarized and collimated laser beam illuminates a liquid crystal array 216 that is comprised of a plurality of closely space, individually selectable, liquid crystal elements. The liquid crystal array includes a common (shared) back electrode and a plurality of front electrodes, one for each liquid crystal element. In a manner that is subsequently explained, the system controller 101 selects one (other systems may select more than one) liquid crystal element to pass the laser beam. The system controller then applies an excitation voltage to the selected liquid crystal element. That excitation voltage causes the liquid crystals of the selected liquid crystal element to align themselves orthogonal to the electrode. The result in that the portion of the polarized laser beam 26 that illuminates the selected liquid crystal element passes through the selected element without rotation. However, the potions of the polarized laser beam 26 that illuminates the unselected liquid crystal elements are rotated 90°. For example, FIG. 2 shows an upper laser beam 26A and a lower laser beam 26B. If the system controller applies an excitation voltage to an "upper" front electrode the laser beam 26A passes through the selected upper element without a polarization shift. Alternatively, if a "lower" liquid crystal element is selected the laser beam 26B passes through the selected lower liquid crystal element without a polarization shift.

After passing through the liquid crystal array 216 the laser beam illuminates a polarizer plate 218. The polarizer plate is aligned such that it passes the portion of the polarized laser beam that passed through the selected liquid crystal element. The other portions of the laser beam 26 are blocked by the polarizer plate. Thus, by selecting various liquid crystal elements the system controller 101 controls where the laser beam emerges from the polarizer plate 218. FIG. 2 shows the laser beam 26A emerging.

Light passed by the polarizer plate 218 passes through a cylindrical lens 220 that focuses the beam in the slow scan (process) direction onto a polygon 222 having a plurality of mirrored facets 224. The polygon 222 rotates in the direction 226. This rotation causes the laser beam 26 to sweep in a scan plane. The sweeping laser beam passes through a post-scan optics system 228 that reconfigures the beam into a circular (or elliptical) cross-section and that refocuses that laser beam 26 onto the surface of the photoreceptor 10. The post-scan optics also corrects for various problems such as scan non-linearity (f-theta correction) and wobble (scanner motion or facet errors). The laser beam produces a light spot that sweeps across the photoreceptor in the direction 103, thereby tracing a scan line 230.

The liquid crystal element selected by the system controller 101 influences the slow scan (process) direction position of the scan line 230. For example, if the system controller selected a different liquid crystal element the relative position of the scan line 230 on the photoreceptor would change to that of scan line 230'. That change would depend upon the separation of the individual liquid crystal elements and on the system's magnification. For example, in one embodiment, if the system controller switches between liquid crystal elements that are separated by 100 microns, the scan line moves 60 microns on the photoreceptor.

The principles of the present invention relate to selecting the individual liquid crystal element or elements that pass the laser beam without a polarization rotation. For example, the printing machine 8 corrects for phasing errors by selecting among the individual liquid crystal elements. Phasing error correction corrects for the spatial difference caused by photoreceptor motion (in the direction 12) during the time between when the image area is in position and when a facet is in position. The mechanics of that correction is described below.

To sense when an image area is in position the printer 8 includes a page sensor 304. The page sensor senses light 306, from a light source 308 that passes through a slot 310 in the photoreceptor. When light is sensed the page sensor signals the system controller 101. The system controller uses page sensor signals to know when to expose and image. The image area is exposed to produce a black image after one page sensor signal, then the image area is exposed to produce a yellow image at the next page sensor signal, and so on. Thus, the page sensor signals are used to register the individual exposures.

The printer 8 also includes a start-of-scan sensor 312. The start-of-scan sensor signals the system controller 101 when the laser beam 26 begins to sweep across the sensor. From the start-of-scan signals the system controller 101 knows the exact position of the polygon at an instant in time.

Still referring to FIG. 2, the printer 8 further includes a motion sensor 432 that senses a plurality of evenly spaced marks 430 on the photoreceptor. The motion sensor outputs motion signals at a rate that depends upon the motion of the photoreceptor. If the photoreceptor motion increases, so does the rate of the motion signals.

Figure 3:
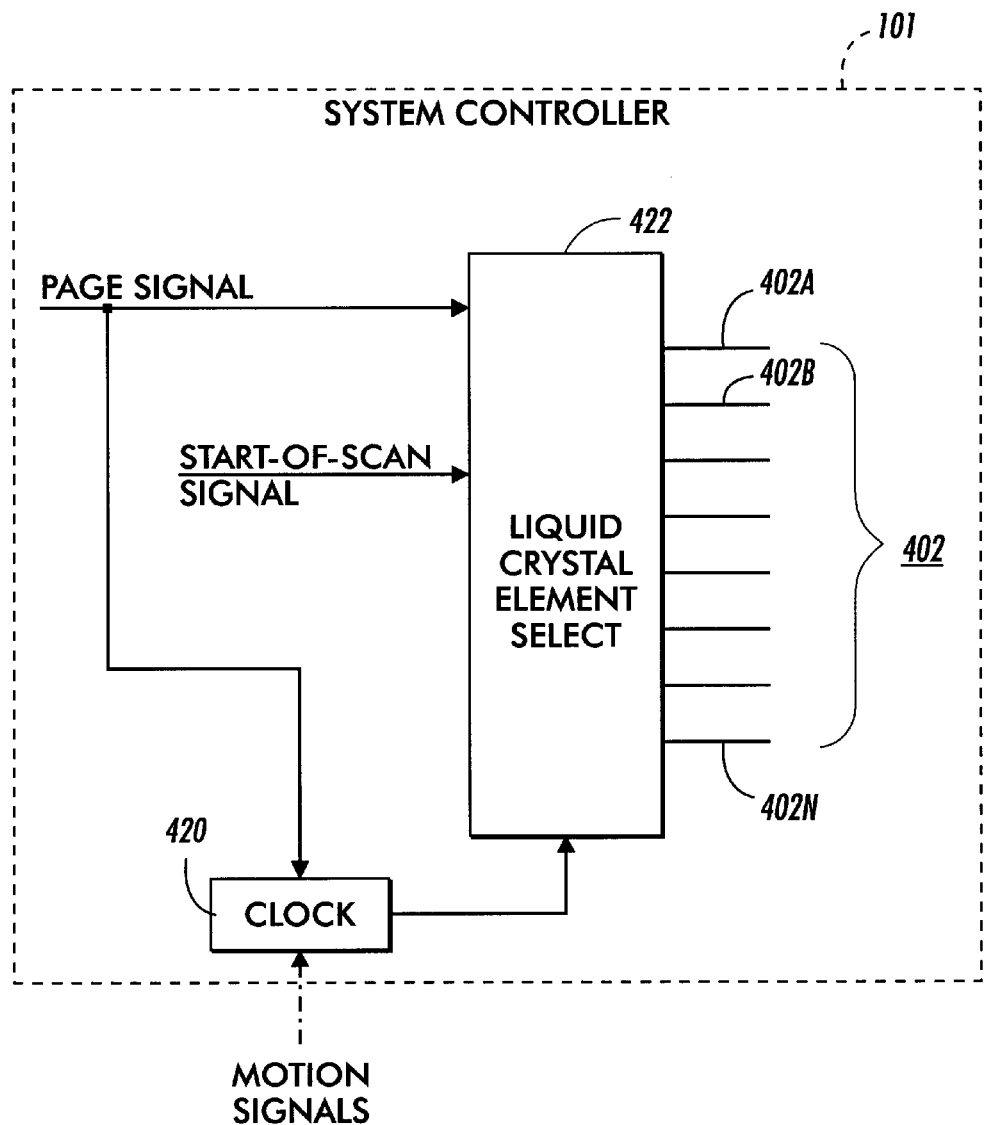

Turning now to FIG. 3, the system controller 101 uses the page sensor signals, the start-of-scan sensor signals, and the motion signals to select which of the individual liquid crystal element(s) pass light. The system controller 101 includes N liquid crystal element control lines, the lines 402A through 402N. When an excitation voltage is applied to a particular control line an associated liquid crystal element passes light.

In operation, a Liquid Crystal Element Select network 422 within the system controller 101 initially "parks" the laser beam 26 at a predetermined position on the photoreceptor 10 by applying an excitation voltage to a control line 402A. The system controller then determines how many motion signals occur between start-of-scan signals. That number is then divided by N (the number of liquid crystal elements), resulting in a number W. when a page signal is received a clock 420 begins counting the motion signals. After W motion signals the clock applies a step signal to the Liquid Crystal Element Select network 422. The Liquid Crystal Element Select network 422 then moves the excitation voltage from control line 402A to control line 402B. After W more motion signals, the excitation voltage moves to 402C. This process continues until a start-of-scan signal occurs. The Liquid Crystal Element Select network then holds the excitation voltage on the control line that was excited when a start-of-scan signal occurred. After the image is fully exposed the Liquid Crystal Element Select network once again parks the laser beam at a predetermined position until another page sensor signal occurs.

Tracking photoreceptor motion using motion signals and "locking" the excitation on a particular control line when a start-of-scan signal occurs is beneficial for correcting for phasing errors. However, the printer 8 also corrects for motion errors after the phasing errors are corrected. The system controller accomplishes this by tracking the motion signals. If the motion signals occur at a constant rate the system controller 101 knows that the photoreceptor motion is constant. However, if the motion signal rate changes the system controller knows that the motion of the photoreceptor has changed. In that case, the Liquid Crystal Element Select network steps the excitation voltage onto the control line that would bring the scan line back toward the proper position. That is, the position that would be proper if the photoreceptor motion was constant.

While the principles of the present invention have been described in conjunction with a specific embodiment, many alternatives, modifications, and variations will be apparent to those skilled in the art. Accordingly, the present invention is intended to embrace all alternatives, modifications and variations that fall within the spirit and scope of the claims.

It is claimed:

1. A method of adjusting a slow scan position of a scan line on a photoreceptor, comprising the steps of:
   producing a light beam;
   illuminating a light valve assembly having a plurality of independently addressable light valve elements with said light beam, wherein each light valve element selectively blocks or passes a portion of the light beam in response to application of an electrical control signal to that light valve element;

sweeping the portion of the light beam that passes said light valve assembly in a scan line across the photoreceptor;

sensing an image area on the photoreceptor;

after sensing said image area sequentially applying an electrical control signal to said individual light valve elements at a controlled rate;

sensing a start of scan position of the sweeping light beam; and holding said electrical control signal on a selected individual light valve element, wherein said selected individual light valve element depends upon a time between said sensing of said image area and said sensing of said start-of-scan.

2. The method according to claim 1, wherein said step of holding said electrical control signal on a selected individual light valve element depends upon the motion of the photoreceptor.

3. The method according to claim 1, further including the step of polarizing the light beam.

4. The method according to claim 3, wherein the selective blocking or passing of a portion of the light beam includes a step of changing the polarization of a portion of the light beam.

5. An apparatus for controlling a position of a scan line on a moving photoreceptor, comprising:

said moving photoreceptor having an image area;

a light source producing a modulated light beam;

an array assembly positioned to intercept the modulated light beam, said array assembly having a plurality of light valve elements, wherein each light valve element has an addressable input line, and wherein each light valve element passes a portion of the modulated light beam when an electrical control signal is applied to that light valve element's input line but blocks a portion of the modulated light beam when the electrical control signal is not applied to that light valve element's input line;

a multifaceted rotating polygon for sweeping a portion of light passed by said array assembly across said photoreceptor so as to form a scan line;

a start-of-scan detector positioned to detect said swept portion of light, said start-of-scan detector producing a start-of-scan signal when said swept portion of light is detected;

a page sensor for sensing said image area, said page sensor for producing a page signal when said image area is sensed; and a system controller receiving said start-of-scan signal and said page signal, said system controller including a plurality of control lines, wherein each control line electrically connects to an associated individual light valve element's addressable input line, said system controller for sequentially applying said electrical control signal to said light valve element addressable input lines at a controlled rate after receipt of said page signal, said system controller further for holding said electrical control signal on a light valve element's addressable input line after said start-of-scan signal occurs;

wherein the position of the scan line depends upon which of said light valve element's addressable input line receives said electrical control signal.

6. An apparatus according to claim 5, wherein said light beam is modulated in accordance with image data.

7. An apparatus according to claim 5, wherein said array assembly includes a polarization plate.

8. An apparatus according to claim 7, wherein a light valve element is a liquid crystal element.

9. An apparatus according to claim 5, further including a motion sensor for producing motion signals that depend upon a motion of said moving photoreceptor.

10. An apparatus according to claim 9, wherein said system controller receives said motion signals and uses said motion signals to determine said controlled rate of sequentially applying said electrical control signal to said light valve element addressable input lines.

11. An apparatus according to claim 9, wherein said system controller receives said motion signals and uses said motion signals to apply said electrical control signal to another light valve element's addressable input line after holding said electrical control signal on a light valve element's addressable input line.

12. An apparatus according to claim 9, wherein said moving photoreceptor includes timing indicia that is sensed by said motion sensor.

13. A printer, comprising:

a moving photoreceptor having an image area;

a charging device for charging said image area;

a raster output scanner for selectively discharging said image area so as to produce a latent image, said raster output scanner including;

a light source producing a modulated light beam;

an array assembly positioned to intercept the modulated light beam, said array assembly having a plurality of light valve elements, wherein each light valve element has an addressable input line, and wherein each light valve element passes a portion of the modulated light beam when an electrical control signal is applied to that light valve element's input line; and a multifaceted rotating polygon, said polygon for sweeping said portion of light passed by said array assembly across said photoreceptor so as to form a scan line;

a developer for depositing toner on said latent image, thereby forming a toner image;

a transfer station for transferring said toner image onto a substrate;

a fusing station for fusing said transferred toner to said substrate;

a start-of-scan detector positioned to detect said swept portion of light, said start-of-scan detector producing a start-of-scan signal when said swept portion of light is detected;

a page sensor for sensing said image area, said page sensor for producing a page signal when said image area is sensed; and a system controller receiving said start-of-scan signal and said page signal, said system controller including a plurality of control lines, wherein each control line electrically connects to an associated individual light valve element addressable input line, said system controller for sequentially applying said electrical control signal to said light valve element addressable input lines at a controlled rate after receipt of said page signal, said system controller further for holding said electrical control signal on a light valve element's addressable input line when said start-of-scan signal occurs;

wherein the position of the scan line depends upon which of said light valve element addressable input line receives said electrical control signal.

14. An apparatus according to claim 13, wherein said light beam is modulated in accordance with image data.

15. An apparatus according to 13, wherein a light valve element is a liquid crystal element.

16. An apparatus according to claim 13, further including a motion sensor for producing motion signals that depend upon a motion of said moving photoreceptor.

17. An apparatus according to claim 16, wherein said system controller receives said motion signals and uses said motion signals to determine said controlled rate of sequentially applying said electrical control signal to said light valve element addressable input lines.

18. An apparatus according to claim 17, wherein said system controller receives said motion signals and uses said motion signals to apply said electrical control signal to another light valve element's addressable input line after holding said electrical control signal on a light valve element's addressable input line.

19. An apparatus according to claim 18, wherein said moving photoreceptor includes timing indicia that is sensed by said motion sensor.

20. An apparatus according to claim 17, wherein said light beam is modulated in accordance with image data.

* * * * *